United States Patent [19]

Rose et al.

[11] 4,165,460

[45] Aug. 21, 1979

[54] COAL-ROCK INTERFACE DETECTOR

[76] Inventors: Robert A. Frosch, Administrator of the National Aeronautics and Space Administration, with respect to an invention of Stephen D. Rose; Charles E. Crouch, both of Huntsville, Ala.; Elborn W. Jones, Mississippi State, Miss.

[21] Appl. No.: 848,793

[22] Filed: Nov. 4, 1977

[51] Int. Cl.² .................... G01V 5/00; G01N 23/20
[52] U.S. Cl. ........................................ 250/253; 250/272
[58] Field of Search .......... 250/253, 254, 256, 358 R, 250/272, 273; 299/1

[56] References Cited

U.S. PATENT DOCUMENTS

| 3,019,338 | 1/1962 | Monaghan et al. | 250/253 |
| 3,723,727 | 3/1973 | Wogman et al. | 250/253 |

*Primary Examiner*—Alfred E. Smith
*Assistant Examiner*—Janice A. Howell
*Attorney, Agent, or Firm*—George J. Porter; John R. Manning; L. D. Wofford, Jr.

[57] ABSTRACT

A coal-rock interface detector employing a radioactive source and radiation sensor wherein the source and sensor are separately and independently suspended and positioned against a mine surface of hydraulic pistons which are biased from an air cushioned source of pressurized hydraulic fluid.

5 Claims, 4 Drawing Figures 4,165,460

COAL-ROCK INTERFACE DETECTOR

ORIGIN OF THE INVENTION

The invention described herein was made in the performance of work under a NASA contract and is subject to the provisions of Section 305 of the National Aeronautics and Space Act of 1958, Public Law 85-568 (74 Sta. 435; 42 U.S.C. 2457).

BACKGROUND OF THE INVENTION

1. Field of the Invention

This invention relates to devices for measuring the depth of coal remaining on the roof or floor of a coal mine, and particularly to devices which accomplish measurement by measurement of backscatter from a radioactive source.

2. General Description of the Prior Art

It has heretofore been known that the distance from the surface of coal to underlying rock may be measured by positioning a radioactive source adjacent to the surface of the coal, and positioning a radiation detector or sensor nearby and measuring the reflected radiation. In this process, gamma photons are emitted by the source and scattered by the coal and rock, redirecting a number of photons back toward the sensor. The lower density of coal does not absorb as many scattered photons as does the higher density rock. Consequently, the more coal between the detector and rock, the greater number of photons which reach the sensor. The exact number is proportional to the coal depth. Ideally, such a device is directly mounted on a coal cutting machine and its cut determined by the depth information obtained from the device. As far as is known, all prior devices of this type have employed a radiation source and radiation detector commonly contained in a single module or housing, which housing contacts a cut coal surface over a relatively large solid plane area. The difficulty with this is that there are often substantial air gaps between the source and detector and coal surface because of irregularities in the surface, and these air gaps produce significant errors in measurement.

Accordingly, it is an object of this invention to provide a gamma backscatter type of coal interface detector which eliminates the above problem and, when mounted on a coal shearing machine, will provide continuous and accurate coal-rock depth-of-interface information.

SUMMARY OF THE INVENTION

In accordance with the invention, a gamma backscatter coal interface detector is mounted on an arm supporting a coal cutting head, and, by means of parallelogram coupled arms, supports a platform member for movement vertically without angular change of the platform member. A radiation source and radiation sensor of the detector are separately positioned on the platform member, and each is independently raised or lowered from the platform member by means of an air cushioned hydraulic system, whereby as cutting progresses and irregularities in the top surface occur, the radiation source and sensor individually follow the smaller area portions of the surface, and thereby substantially reduce cavities between each of these and the surface. As a result, the accuracy of the detector is greatly increased.

DETAILED DESCRIPTION OF THE DRAWINGS

Figure 1:
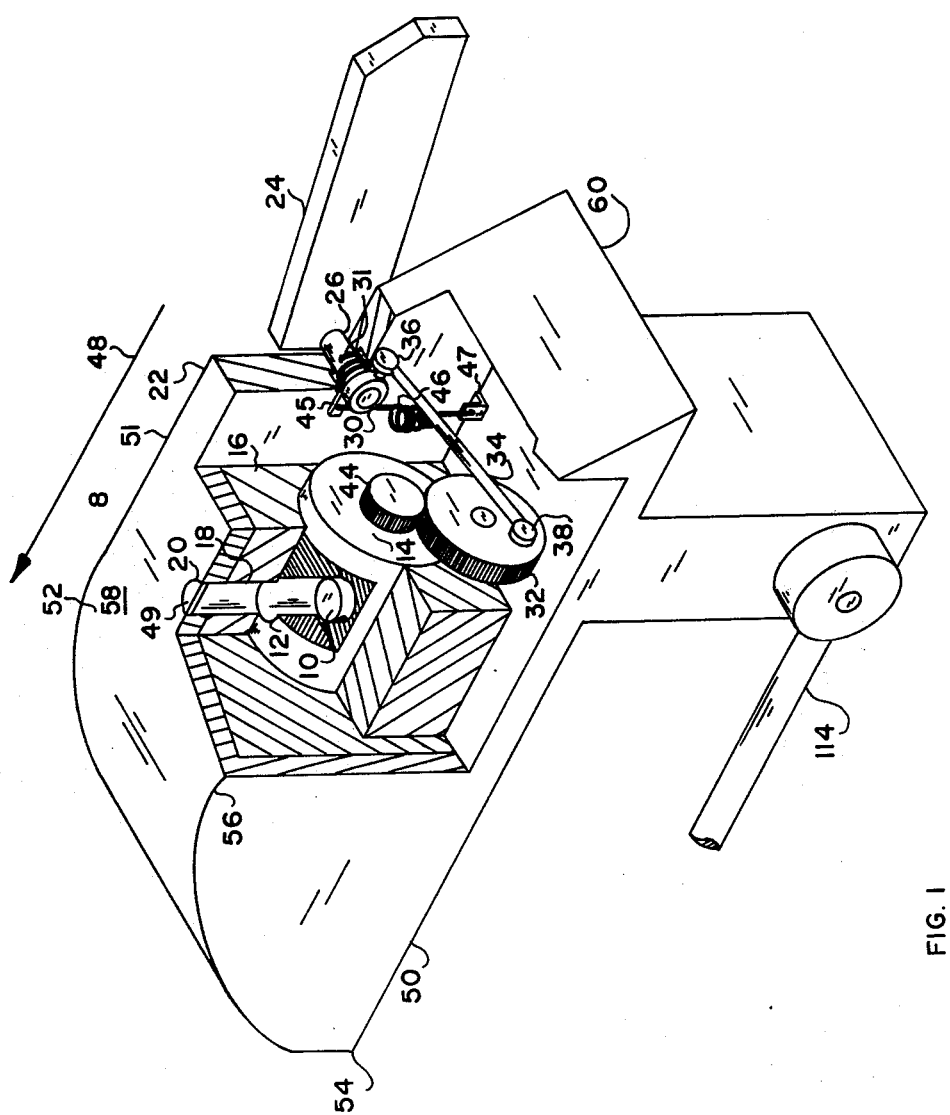
FIG. 1 is a pictorial view illustrating the overall assembly and organization of components of the invention.

Referring to FIG. 1, radiation source unit 8 employs a radiation source 10, such as Cesium 137, which is positioned in chamber 12 of cylinder 14. Chamber 12 extends radially from the approximate axis of cylinder 14 to the periphery of the cylinder. Cylinder 14 is enclosed by and rotates within lead enclosure 16, and, depending upon the rotational position of cylinder 14, chamber 12 is either closed off by lead enclosure 16 or it connects through passageway 18 of the enclosure and opening 20 in housing 22 to the outside of the housing. The rotation of cylinder 14 is effected by rotation of lever 24 and connected shaft 26, the latter extending inward through housing 22. Rotatable force is coupled from shaft 26 to collar 30 on shaft 26 by spring 31 which connects between shaft 26 and collar 30. The rotatable movement of collar 30 is transmitted to gear 32 by link 34 through ball joint connections 36 and 38, respectively, of link 34. In turn, gear 32 drives a smaller gear 44 which is attached to and rotates cylinder 14. By the employment of spring 31 as a torsional link, a cushioned response is achieved between lever 24 and cylinder 14.

In a normal or resting state, lever 24 is biased upward (90° from the shown position), biasing being by means of a biasing lever 45 on shaft 26 which is coupled by spring 46 to bracket 47 on housing 22. This causes cylinder 14 to be turned approximately 180° from the indicated position, whereby outward radiation from source 10 is blocked by lead enclosure 16. Lever 24 would be moved to the indicated or operating position by virtue of the combination of forward motion (along arrow 48) and upward movement of source unit 8, which would cause lever 24 to be triggered by the roof or floor surface of a mine, and thus be rotated clockwise. In an operating mode, chamber 12 is aligned, as shown, with passageway 18 and opening 20, and thereby radiation will be emitted outward from source unit 8. To protect the interior of chamber 12 from debris, a polyurethane diaphragm 49 is positioned in opening 20, it being largely transparent to gamma radiation.

Outwardly, housing 22 is formed of vertical sides 50 and 51 and a roof 52, the latter sloping upward from leading edge 54 (with respect to the direction of travel indicated by arrow 48) to flat surface 58 and then slopes downward to trailing edge 60. Alternately, the roof of the housing would be circular. In use, surface 22 is in constant sliding contact with a coal mine surface.

Figure 2:
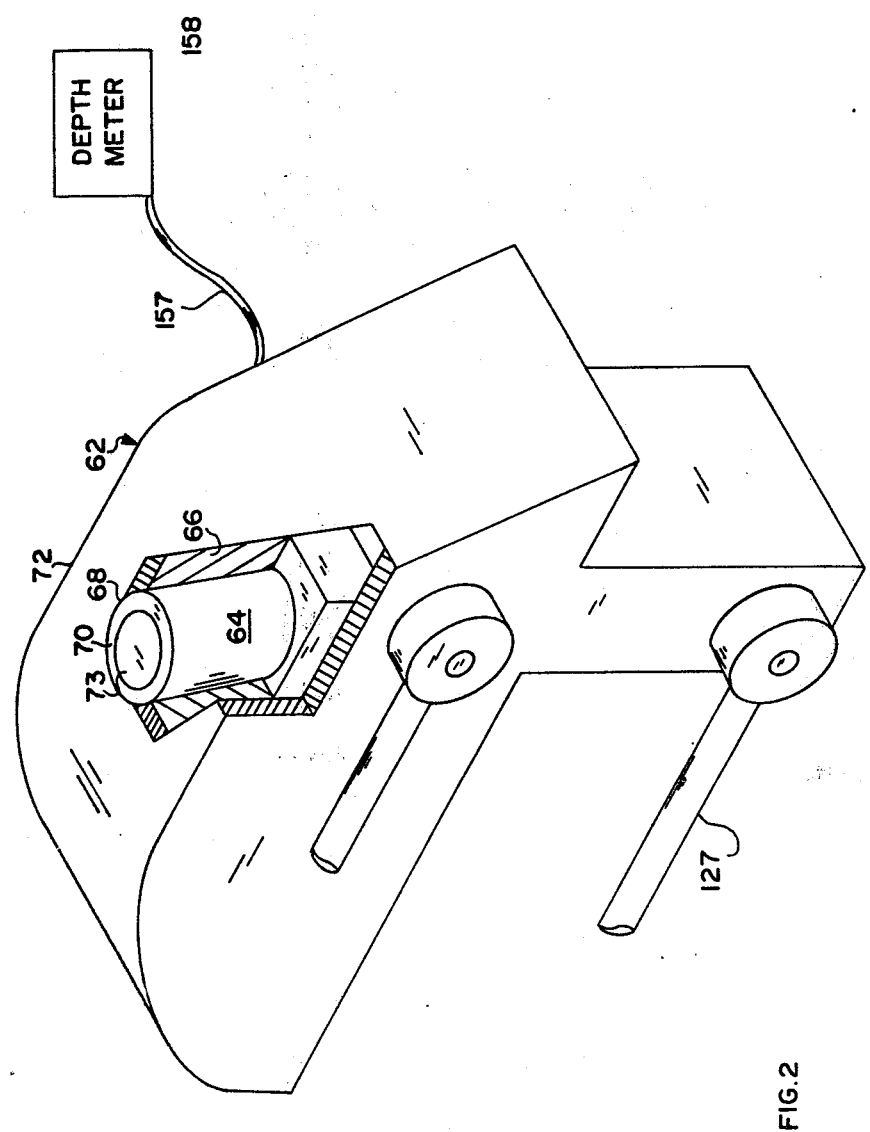
FIG. 2 is a pictorial view illustrating the radiation source unit of the invention.

Referring to FIG. 2, radiation detection unit 62 employs a conventional scintillation detector 64 which provides an electrical output on leads 157 to meter 158 proportional to the radiation it receives. Meter 158 would be conveniently positioned for viewing by the operator of a mining machine on which the system of this invention is mounted, and would be scaled in a conventional scale in terms of coal depth to a rock interface.

Scintillation detector 64 is generally enclosed by a lead enclosure 66, but open at end 68 to coincide wth an opening 70 in housing 72, through which radiation is received. The opening in housing 72 is plugged by a polyurethane diaphragm 73 to generally provide protection for scintillation detector 64, but still enabling the penetration of radiation without significant (10%) attenuation. As shown, housing 72 is identical in contour to that of housing 22 of radiation source unit 8.

Figure 3:
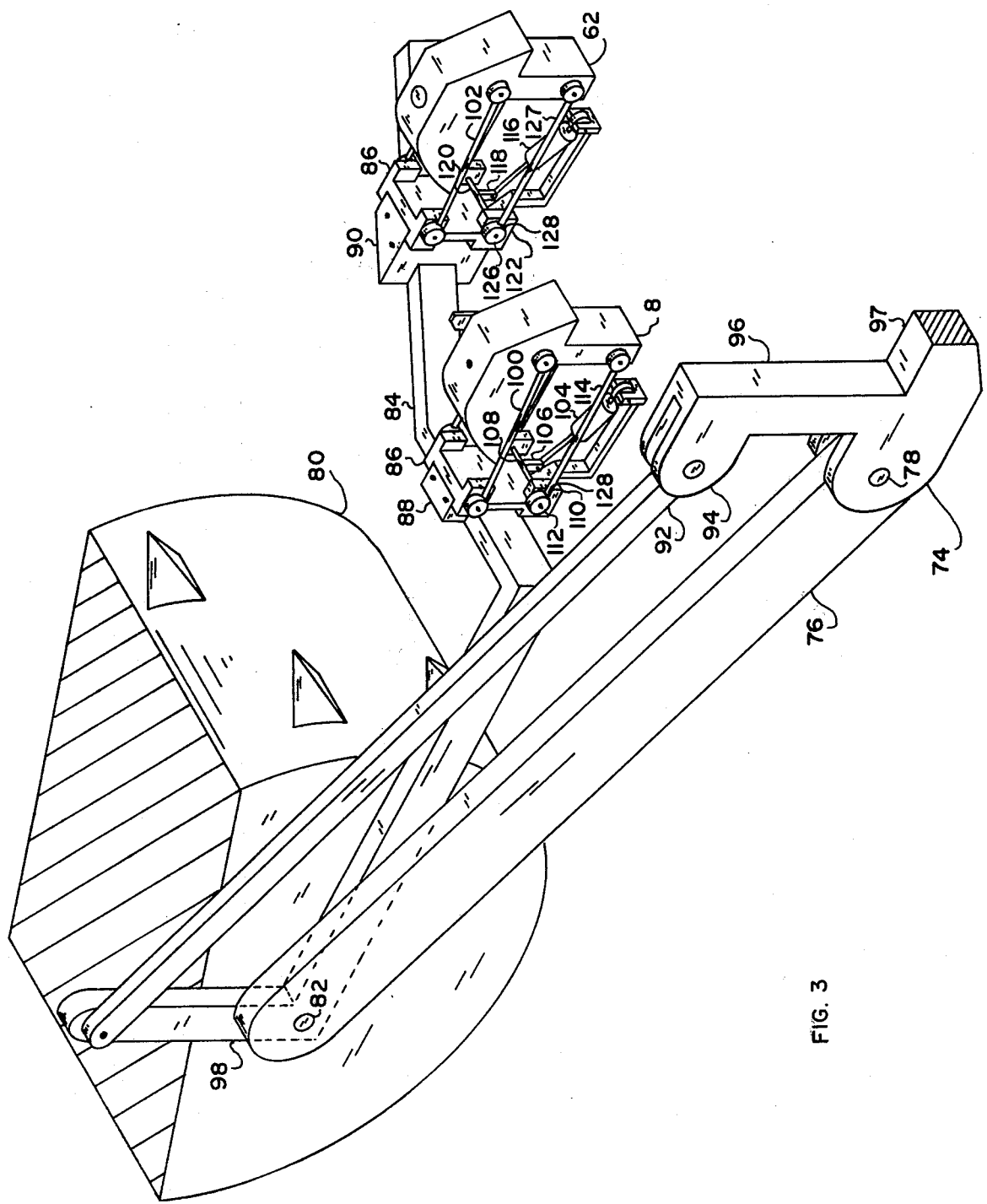
FIG. 3 is a pictorial view of the radiation detection unit of the invention.

FIG. 3 illustrates the mounting of radiation source unit 8 and detection unit 62 on a coal mining machine 74, such as a longwall shearer. The longwall shearer includes an elongated arm 76 which is pivotally mounted at one end by pin 78 on the frame of the machine. Coal shearing drum 80 is mounted on the opposite end of arm 76 and is rotably driven, by means not shown. Coal is continuously sheared or cut from a wall of a mine by movement of rotating drum 80 on arm 76 about pin 82, by means not shown. It is a particular function of this invention to determine the height or elevation of a cut by determining the location of a coal-rock interface.

Radiation source unit 8 and detection unit 62 are individually supported on a mounting arm 84 through identical parallelogram mounting brackets 86 which enable the units to maintain their angle of orientation despite vertical movement with respect to mounting arm 84. Mounting brackets 86 are affixed to arm 84 through mounting blocks 88 and 90. In case of a tunnel cave-in, brackets 84 will shear (by means not shown) from blocks 88 and 90 to hang downward in a more protected position. Mounting arm 84 is supported on the mining machine through supporting members which maintain an essentially level reference for the mounting arm while moving it coordinately with vertical movement of shearing drum 80. This is accomplished by a parallelogram arrangement of arms wherein an arm 92 is pivoted at end 94 to vertical arm 96 attached to frame 97 of the mining machine. The opposite end of arm 92 is pivotally attached to arm 98 which is pivotally mounted at an opposite end to shaft 82 of shearing drum 80. Arm 98 in turn is connected at right angles to mounting arm 84. The distance between pivots of arms 98 and 96 are identical, and the distance between pivots of arms 92 and 97 are identical. Thus, mounting arm 84 is maintained in the desired reference plane, e.g., level, as shearing drum 80 is raised and lowered.

Figure 4:
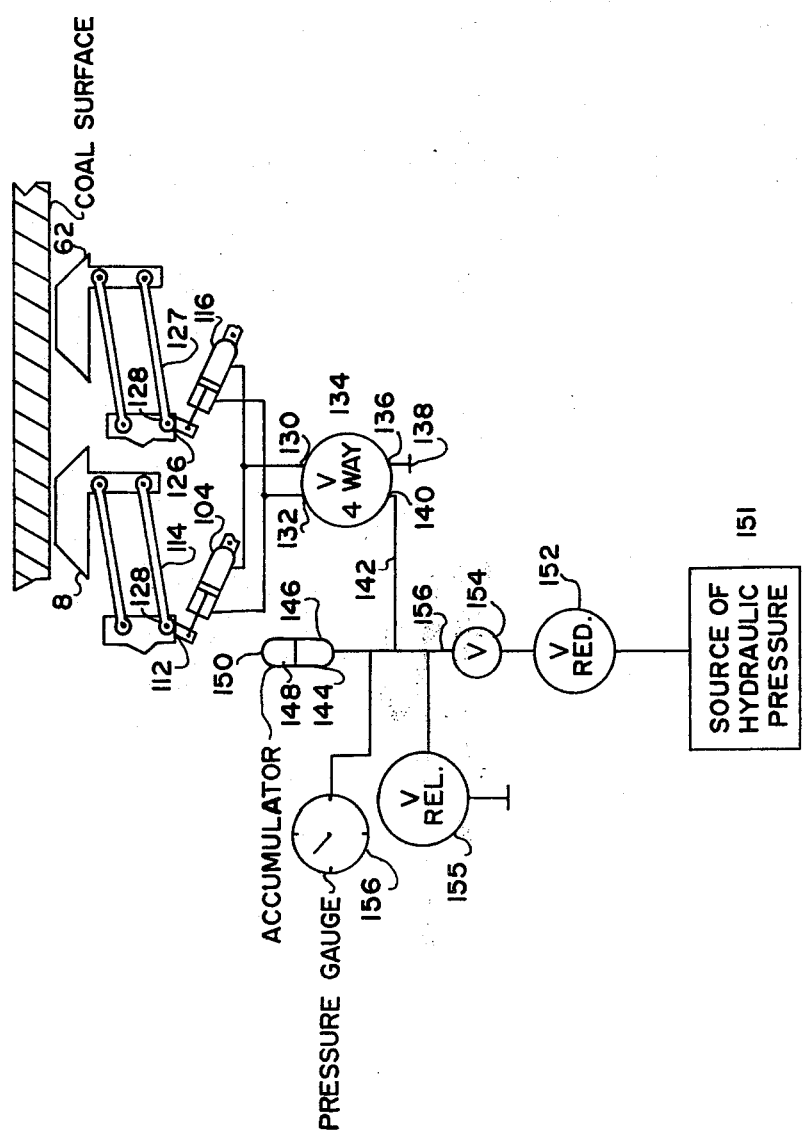
FIG. 4 is a diagrammatic illustration of the hydraulic circuit by which the radiation source and detection units are biased against a coal surface.

Referring additionally to FIG. 4, identical four-bar parallelogram assemblies 100 and 102, which mount source unit 8 and detector unit 62 on mounting arm 84, are biased to a desired elevation and contact force between these units and the surface of a mine by hyraulic cylinders. Thus, referring to the mounting of source unit 8, one end coupling of hydraulic cylinder 104 is pivotally connected to lever arm 106, and lever arm 106 is connected to shaft 108, rotably supported by bracket 110, and shaft 108 rigidly connects to end 112 of lower arm 114 of parallelogram 100. Thus, the effect of the application of a hydraulic pressure across cylinder 104 is to rotate lever 106 and thereby raise (or apply greater pressure to) or lower (or apply less pressure to) source unit 8 through bracket 110. Similarly, hydraulic cylinder 116 is coupled to lever arm 118, and lever arm 118 is connected to shaft 120, rotably mounted by bracket 122, and shaft 120 rigidly connects to end 128 of lower arms 127 of parallelogram assembly 102.

Hydraulic cylinders 104 and 116 are hydraulically coupled in a parallel fashion to coupling points 130 and 132 of four-way valve 134. Coupling point 136 is simply a drain connection and connected to a drain 138, and coupling point 140 is connected through line 142 to a source of hydraulic fluid pressure which is illustrated by hydraulic fluid 144 in the lower portion of accumulator 146. Compressed air 148 is in the upper portion 150 of accumulator 146. Initially, hydraulic fluid under pressure is supplied from a source 151 of hydraulic fluid under pressure through pressure reduction valve 152 and shut-off valve 154 of the hydraulic cylinders and accumulator 146. Relief valve 155 is connected to line 156 above valve 154 and simply provides a safety relief function in the event that pressure in the line should become excessive.

The procedure for charging the system is as follows:
1. Close valve 154.
2. Operate four-way valve 134 to allow both hydraulic cyliners 104 and 116 to extend fully.
3. Operate four-way valve 134 to retract both cylinders. This should allow accumulator 146 to force its remaining oil into both cylinders.
4. Repeat step 2.
5. Pressurize accumulator 146 through valve 154 to a gas (e.g., air) pressure of approximately 250 PSIA. This may be revised upward in the event that the system response at the top of a piston stroke is too slow.
6. Adjust pressure reducing valve 152 for oil pressure commensurate with a value of air pressure for a desired hydropneumatic response. Thus, with a value of 250 PSI for air pressure, it has been found that 277 PSIG is appropriate.
7. Open manual shut-off valve 152 between accumulator 146 and the coil supply.
8. After accumulator oil reaches 277 PSIG, as read by gauge 156, turn off valve 152 to the oil supply.
9. Operate four-way valve 134 to a position to retract pistons of both cylinders.

Assuming that this procedure has been carried out correctly, the pistons should be fully retracted at this time, and the cylinder pressure should be slightly larger than 250 PSIA.

Considering that the pressure drop in the system because of pipe friction in the hydraulic lines will have an adverse effect on dynamic performance, this has been minimized by utilizing 0.5 inch diameter tubing for the lines.

Referring to FIG 3, it is to be noted that in order to maintain a desired adjustable separation and distance between source 8 and detector 62 of from 10.5 to 22.5 inches, detector 62 is positioned 51° behind the source. This moves the center of the gamma ray path to 54.5 inches behind the shearing drum center line for a 22.5-inch separation distance.

To commence operation, and with the shearing drum being moved upward, and the machine being moved to the left as shown in FIG. 3, lever 24 is rotated down by engagement with the roof or ceiling of a mine (not shown). This effects rotation of cylinder 14 and the exposure of the surface of the mine to radiation from source 10. Depending upon the depth of coal in the surface, that is, distance from the surface of coal to the surface of rock, the quantity of radiation is picked up by radiation detector 62, decreasing as rock is approached. The output of scintillation detector 64 is typically indicated by meter 158 observable by the operator of machine 74 to thus enable him to operate the shearing drum to a desired position of cut to shear the coal close to the coal-rock interface. As the shearing head progresses, the source and detector units separately follow the surface of the mine. Thus, since the upper contact surface of each of these units is relatively small, approximately 3¼ inches square (or round), the typical variation in surface relief is small, and thus the depth of air cavities between the units and mine surfaces are usually smaller. As a result, this invention enables a substantial improvement in accuracy of measurement over prior art devices.

Having thus disclosed our invention, what is claimed is:

1. A coal-rock interface detector comprising:
    a source of gamma radiation;
    a radiation detector;
    a frame;
    first support means mounted on said frame for independently, and vertically variably, positioning said source of gamma radiation adjacent to a coal surface as said frame is moved along the coal surface;
    second support means mounted on said frame, independent of said frame and independent of the position of said source of gamma radiation, for vertically variably, positioning said radiation detector adjacent to said coal surface as said frame is so moved along the coal surface.

2. A coal-rock interface detector as set forth in claim 1 wherein:
    said first support means includes means for raising and lowering said source of radiation, and for maintaining the orientation of said source of radiation at a discrete angular orientation with respect to a vertical line as said source of radiation is raised and lowered; and
    said second support means includes means for raising and lowering said radiation detector and for maintaining the orientation of said radiation detector at a discrete angular orientation with respect to a vertical line as said radiation detector is raised and lowered.

3. A coal-rock interface detector as set forth in claim 2 further comprising means generally surrounding said source of radiation for shielding against the emission of radiation, and means responsive to said source of radiation being positioned adjacent to a said surface for providing a passageway for emission of radiation along a selected path only when said source of radiation is adjacent to said surface and for blocking said passageway when said source of radiation is moved away from said surface.

4. A coal-rock interface detector as set forth in claim 3 further comprising:
    a first housing generally surrounding said radiation source, and including a generally flat contact area and a radiation window across said passageway;
    first force biasing means for urging said contact area housing against a said surface;
    a second housing generally surrounding said radiation detector, and including a generally flat contact area and a window for the reception of radiation; and
    second force biasing means for urging said second housing and its flat contact area against a said surface.

5. A coal-rock interface detector as set forth in claim 4 wherein each said force biasing means comprises a hydropneumatic cylinder and means for providing a gas cushioned source of hydraulic fluid to said cylinder.

* * * * *